Sept. 20, 1966

K. E. SNYDER 3,273,674

TORQUE BOOSTED BRAKE

Filed Sept. 18, 1963

INVENTOR.
Kenneth E. Snyder
BY

R. L. Spencer

ATTORNEY

United States Patent Office 3,273,674
Patented Sept. 20, 1966

3,273,674
TORQUE BOOSTED BRAKE
Kenneth E. Snyder, Northville, Mich., assignor to General Motors Corporation, Detroit, Mich., a corporation of Delaware
Filed Sept. 18, 1963, Ser. No. 309,759
9 Claims. (Cl. 188—72)

This invention relates to a friction gripping device and more particularly to a friction gripping device for use in a power transmitting device and incorporating a self-energizing structure effective upon initiation of gripping action to assist in completing engagement of the friction gripping elements of the device.

In automotive transmissions commonly referred to as automatic transmissions, it is common practice to accomplish change of drive ratio by engaging and disengaging various friction gripping devices such as brakes and clutches. In automotive installations it is highly desirable that such transmissions occupy as little space as possible in order to reduce the size of the common floor board "hump" in the vehicle and at the same time provide proper road clearance. One of the limiting factors on transmission size is the requirement that the friction gripping devices employed, whether they be clutches or brakes, be of sufficient size to handle the torques to which they are subjected without slipping. One way to reduce the size of such devices is to employ very high actuating pressures. This is undesirable in automotive practice since the pressures used are developed at the expense of engine horsepower and high pressures necessarily reduce fuel economy.

An object of this invention is to provide a friction gripping device incorporating self-energizing means effective upon initial gripping of the friction surfaces of the device to assist the initiating means to complete engagement of the friction surfaces.

Another object of this invention is to provide a friction gripping device incorporating an axially movable piston movable in response to fluid pressure supplied thereto for engaging friction surfaces and means within the piston responsive to torque loading for applying thrust to the piston tending to engage the friction surfaces.

A further object of this invention is to provide a friction gripping device incorporating a piston movable in response to fluid pressure supplied thereto for initiating engagement of friction surfaces and incorporating ball mechanism within the piston effective upon initiation of engagement of the friction surfaces by the piston to apply a mechanical force to the piston acting in assistance to the fluid pressure to complete engagement of the friction surfaces.

An additional object of this invention is to provide a friction gripping device incorporating an axially movable piston movable in response to fluid pressure to initiate engagement of friction surfaces and to provide additional self-energizing means responsive to torque loading for applying a mechanical force to the piston acting in assistance to the fluid pressure incorporating a hardened ball ramp carried by the piston and inclined at an angle to the direction of travel of the piston and including a series of balls within the piston and contacting the ramp.

A more specific object of this invention is to provide a friction gripping device incorporating friction gripping surfaces adapted to be engaged and released including a piston axially movable with respect to a cylinder, a recess in the piston having a wall inclined at an angle to the path of travel of the piston, a pin fixed to the cylinder and extending into the piston recess at an angle to the path of travel of the piston and rollers contacting the pin as a reaction surface and contacting the wall of the piston recess for applying an axial component of mechanical force to the piston acting in assistance to fluid pressure force applied to the piston and effective upon contact of the friction surfaces of the friction gripping device.

These and other objects and advantages of this invention will be apparent from the following description and claims, taken in conjunction with the accompanying drawings, in which:

Figure 1:
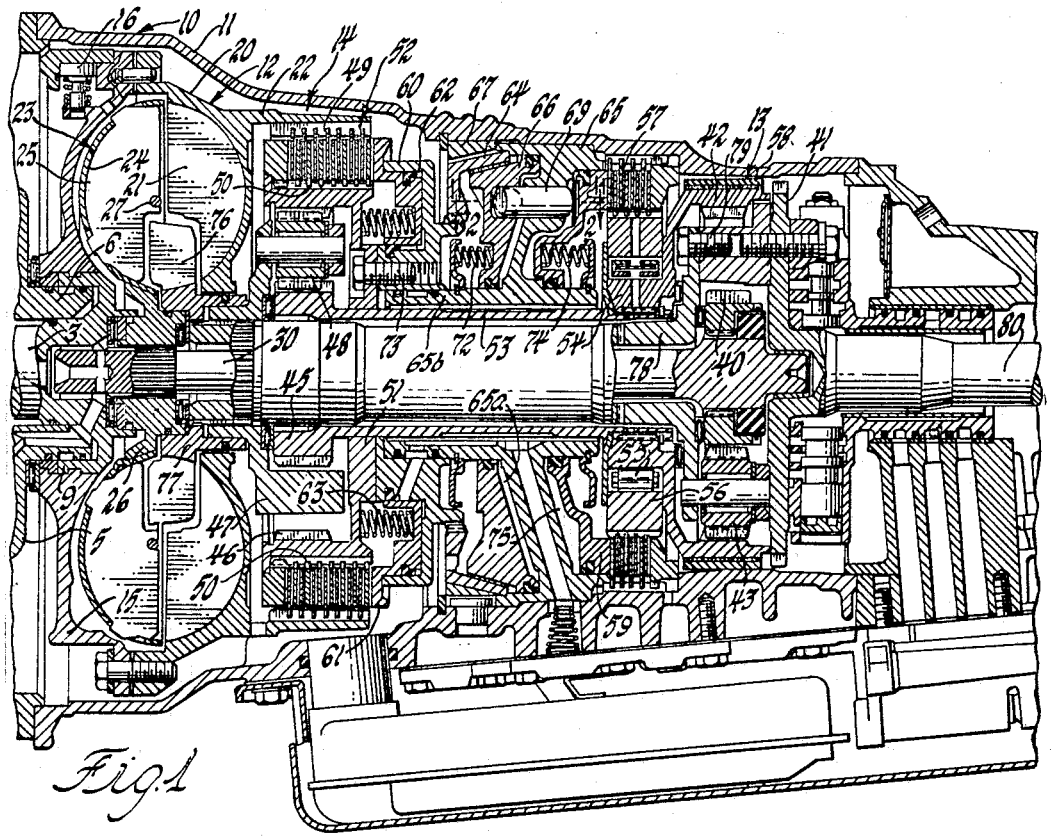
FIGURE 1 is a sectional view of a transmission constructed in accordance with the principles of this invention.

Referring to FIGURE 1 there is shown a transmission 10 having an outer case 11, a hydrodynamic torque transmitting unit 12, a first gear unit 13 and a second gear unit 14.

An engine driven power input shaft 3 is rotatably supported in an axially extending support boss 6 formed on a casing web 5. Shaft 3 includes an axially extending annular support flange 9 overlying the exterior surface of boss 6 for driving a torus cover 15. Boss 6 on web 5 therefore supports shaft 3 both internally and externally of the boss and rotatably supports torus cover 15. Torus cover 15 is driven by power input shaft 3 at engine speed and carries a series of dump valves 16, one of which is shown.

An impeller 20 having vanes 21 and a clutch drum 22 is bolted to torus cover 15 for rotation therewith. A turbine 23 is composed of a shell 24, vanes 25 and a hub 26. A support ring 27 supports the vanes on the shell 24. Hub 26 is splined to a transmission main shaft 30 for driving shaft 30. Vanes 21 and 25 are recessed to receive a second turbine 76.

A first gear unit 13 is composed of a sun gear 40, planet carrier 41, a ring gear 42 and a plurality of planet gears 43 in mesh with sun gear 40 and ring gear 42. Turbine 76 is splined to a sleeve shaft 78 fixed to carrier 41. Carrier 41 in turn is fixed to a final power delivery shaft 80. A second gear unit 14 includes a gun gear 45, a ring gear 46, planet carrier 47 and a plurality of planet gears 48 in mesh with sun gear 45 and ring gear 46. A series of clutch discs 49 driven by clutch drum 22 are adapted to engage and be released from clutch discs 50 on a clutch hub 51 and form an engageable and releasable clutch indicated generally at 52. Sun gear 45 is provided with a hollow sleeve extension or shaft 53 which is splined to an inner race 54 of a one-way brake assembly and formed integrally with ring gear 42. A one-way brake 55 is disposed between inner race 54 and an outer race 56. Outer race 56 may be held against rotation by means of a disc brake 57 when the disc brake is engaged. An additional two-way brake band 58 may be applied to prevent rotation of ring gear 42 when desired. Brake 57 may be engaged by admitting fluid pressure to a piston 59 and brake 58 may be applied by a fluid pressure responsive servo (not shown).

A rotatable cylinder 60 bolted to clutch hub 51 and ring gear 46 formed on hub 51 has a clutch actuating piston 61 disposed therein for engaging clutch 52 upon admission of fluid pressure to a chamber 62 adjacent piston 61. A clutch release spring 63 seated on clutch hub 51 biases piston 61 to a clutch release position when fluid pressure is released from chamber 62. A conical brake 64 is splined to cylinder 60 for axial motion with respect to the cylinder and for rotation therewith. A cylinder 65 fixed to housing 11 contains a piston 66 adapted to force the conical brake 64 against a conical backing member 67 upon admission of fluid pressure to a chamber 65a.

Figure 2:
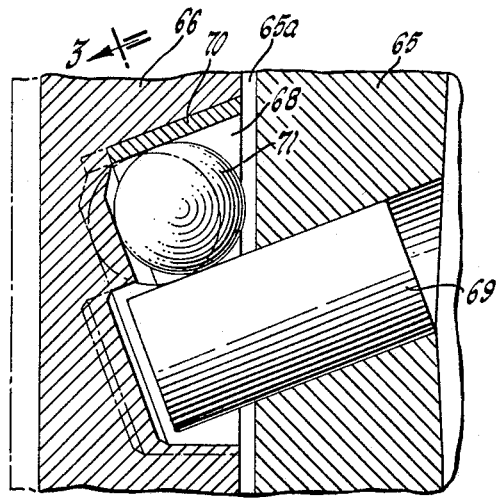
FIGURE 2 is an enlarged sectional view taken along the line 2—2 of FIGURE 1 illustrating the relationship of the cylinder, pin, piston recess, and balls for applying axial thrust to the piston upon initial engagement of the friction gripping surfaces.
Figure 3:
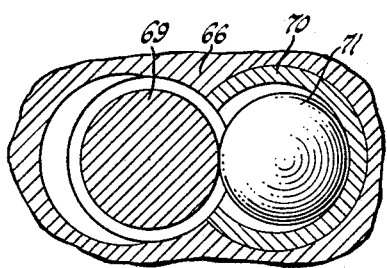
FIGURE 3 is a sectional view taken along the line 3—3 of FIGURE 2.

As best shown in FIGURES 2 and 3, piston 66, which is movable axially in cylinder 65, is provided with an opening 68 adapted to receive a pin 69 fixed in cylinder 65. Piston 66 is formed of aluminum and opening 68 is provided with a hardened ball seat insert 70, which constitutes an effective cam surface for a ball 71. It will be noted that insert 70 which comprises a ball contact surface, and pin 69, which comprises a second ball contact surface, are both inclined downwardly with respect to the axial direction of movement of piston 66 in cylinder 65. Opening 68 is of sufficient size such that pin 69, while extending into opening 68 never contacts piston 66. Assuming that fluid pressure is admitted to chamber 65a between piston 66 and cylinder 65, the piston will initially move axially solely under influence of such fluid pressure to force the conical brake member 64 against backing member 67. Upon contact of the conical surfaces 64 and 67, a friction drag is imposed upon piston 66 tending to cause angular rotation of the piston in cylinder 65. As best shown in FIGURES 2 and 3, limited angular rotation of piston 66 with respect to cylinder 65 will cause the balls 71 to rotate slightly on the inclined pin 69 and to apply an axial component of thrust to piston 66 acting in assistance to fluid pressure in chamber 65a tending to engage the piston against conical member 64. Axial motion of piston 66 is further facilitated due to the fact that pin 69 never physically contacts piston 66, but only contacts the ball rollers 71, thus minimizing friction drag between the pin and piston. The axial thrust applied to the piston acting in assistance to fluid pressure in chamber 65a and tending to move the piston toward its engaged position results from the fact that pin 69 is inclined downwardly from the axial path of travel of the piston so that with pin 69 acting as a reaction point an axially directed mechanical force is applied by the balls to the piston through ring 70 when the piston tends to rotate with respect to the pin. The pin, balls 71 and ring 70 permit only limited angular rotation of the piston in cylinder 65. While only one ball 71 is illustrated in the drawing, three balls spaced around pin 69 one hundred and twenty degrees apart will actually be employed.

Referring further to FIGURE 1, a release spring 72 assures release of piston 66 from member 64 when fluid pressure is exhausted from chamber 65a. It will readily be understood that upon introduction of fluid pressure to chamber 65a, both a hydraulic force and a mechanical force act on piston 66 to brake ring gear 46 against rotation, since cylinder 60 is bolted to ring gear 46 by bolts 73. An axially extending cylindrical boss 65b on cylinder 65 supports member 60 in the assembly. A brake release spring 74 acting on piston 59 assures release of disc brake 57 upon release of fluid pressure from a chamber 75 in cylinder 65. Disc brake 57 is engaged by fluid pressure acting in chamber 75. A second turbine 76 disposed between impeller 21 and turbine 25 is directly connected to final power delivery shaft 80 by means of a hollow shaft 78 splined to hub 77 of turbine 76 and bolted to planet carrier 41 by a bolt 79.

The transmission, in operation, is adapted to provide neutral, reverse, and three forward drive ratios including low, second, and high or direct drive. For low or first gear drive, hydrodynamic torque transmitting unit 12 is filled with working fluid and disc brake 57 is engaged. With disc brake 57 engaged, one-way brake 55 is rendered effective to prevent reverse rotation of ring gear 42 under influence of torque being transmitted from input shaft 3 to output shaft 80. At engine idle, with the vehicle stopped, planet carrier 41 will be held against rotation due to the load of the vehicle on shaft 80. Impeller 21 will rotate with turbines 23 and 76 remaining stationary. As impeller 21 is speeded up, turbine 23 will initially drive sun gear 40 through the transmission mainshaft 30 and cause planet carrier 41 and shaft 80 to rotate forwardly in the reduction of gear unit 13. Turbine 76 will likewise rotate forwardly in reduction drive at the speed of rotation of output shaft 80. In this stage of operation, turbine 76 functions as a forwardly rotating reaction member to redirect fluid delivered by turbine 23 to impeller blades 21 so that the re-directed fluid entering impeller blades 21 tends to rotate the impeller forwardly. In this drive ratio the hydrodynamic torque transmitting unit functions as a hydraulic torque converter so that output shaft 80 is driven partially by mechanical torque multiplication of gear unit 13 and partially by the torque multiplication of unit 12.

For second gear drive, unit 12 is emptied of fluid, brake 57 remains engaged, and clutch 49-50 is engaged. Shaft 80 is driven entirely mechanically at the drive ratio of gear unit 14.

For direct drive, clutch 49-50 remains engaged. Brake 57 remains engaged, and unit 12 is refilled with fluid. In direct drive, turbine 76 functions as a second rather than a forwardly rotating reaction member.

For reverse drive, reverse cone brake 64 is engaged while the other clutches and brakes are released. Fluid unit 12 is filled with fluid. Ring gear 46 or gear unit 14 is held against rotation. Turbine 23 drives sun gear 40 forwardly in the direction of rotation of impeller 21. Due to the vehicle load on planet carriers 41 and 47, the carriers tend to remain stationary. Ring gear 42 and sun gear 45 therefore rotate reversely, since forward brake 57 is released. As a consequence, this backward rotation of sun gear 45 will cause carrier 47 to rotate backwards at reduced speed. Turbine 76 also imparts rotation in a reverse direction to shaft 78. Output shaft 80 will therefore be driven in reduction drive through gear unit 14 and will have an additional reverse torque applied thereto by turbine 76. As heretofore explained, cone brake piston 66 is applied to cone brake member 64 initially through action of fluid pressure in chamber 65a. Upon initial engagement of the cone brake, the balls 71 with the inclined pin 69 serving as a reaction surface, apply additional mechanical force to piston 66 acting in assistance to hydraulic pressure to engage the cone brake. This improvement is important in that it permits use of a relatively small servo so that smooth initial brake engagement is had upon shifting into reverse. The additional mechanical force applied to the piston does not develop until the brake is initially lightly engaged. Thus there is no harsh brake engagement, while adequate braking capacity is obtained to prevent slippage of the brake under reverse torque.

An overrun brake 58 is provided to prevent either forward or reverse rotation of ring gear 42 when desired, and is particularly useful for overrun braking in low gear for descending long or steep grades.

It will be understood that the provision of the pin and rollers within the piston as disclosed provides for a compact structure per se and further makes possible a smaller diameter piston for a given brake capacity. The rollers 71 reduce friction drag between the piston and pin 69 and due to the inclination of pin 69 to the axis of travel of piston 66 are responsive to angular rotation of the piston arising from initial engagement of the friction surfaces by the piston in response to fluid pressure supplied to the piston to apply mechanical thrust to the piston tending to complete the engagement of the friction surfaces and to limit the permissible range of rotation of the piston with respect to cylinder 65 and pin 69.

I claim:
1. In a transmission having a brake adapted to be engaged and disengaged, a piston responsive to fluid pressure for initiating engagement of said brake, and means responsive to initial engagement of said brake for applying a force to said piston assisting the fluid pressure acting on said piston to complete engagement of said brake, said means comprising a reaction member inclined to the direction of travel of said piston and a roller coating with said reaction member and piston.

2. In a transmission having a brake having friction surfaces adapted to be engaged and disengaged, a fluid pressure responsive piston for moving said friction surfaces into initial contact, and mechanical means responsive to friction drag of said surfaces for applying additional force to said piston to complete the engagement of said friction surfaces, said mechanical means comprising a reaction member inclined to the path of travel of said piston and a plurality of rollers coacting with said piston and reaction member to limit the rotation of said piston relative to said reaction member.

3. In a transmission having a brake having friction surfaces adapted to be engaged and disengaged, an axially movable piston for establishing initial contact of said friction surfaces in response to fluid pressure supplied to said piston, said piston being rotatable in response to contact of said friction surfaces, and mechanical means responsive to rotation of said piston for limiting the permissible range of rotation of said piston and for applying a thrust to said piston tending to engage said friction surfaces, said mechanical means including a grounded reaction member inclined to the path of travel of said piston and a ball roller disposed between said piston and reaction member.

4. In a transmission of the type having friction gripping surfaces adapted to be engaged and released, a cylinder, a piston axially movable in response to fluid pressure for initiating engagement of said friction gripping surfaces, said piston being rotatable with respect to said cylinder in response to contact of said friction gripping surfaces, a recess in said piston, means for limiting the angular rotation of said piston and for applying additional thrust acting in assistance to said fluid pressure comprising a pin fixed to said cylinder and a plurality of balls positioned in said recess between said pin and a wall of said cylinder.

5. In a transmission of the type having friction gripping members adapted to be engaged and released, a cylinder, a piston axially movable in response to fluid pressure supplied thereto for initiating engagement of said friction gripping members, a recess in said piston, a pin fixed to said cylinder and extending into said piston recess, and a ball disposed in said recess, said ball contacting said pin and a wall of said cylinder for applying a thrust to said piston acting in assistance to fluid pressure supplied to said piston upon initial engagement of said friction gripping members.

6. In a transmission of the type having friction gripping surfaces adapted to be engaged and released, a cylinder, a piston axially movable with respect to said cylinder in response to fluid pressure for initiating engagement of said friction gripping surfaces, said piston being rotatable in said cylinder in response to contact of said friction gripping surfaces, a recess in said cylinder, and means for applying an axial thrust to said piston in response to rotation of said piston comprising a pin anchored to said cylinder and extending into said piston recess, said means further including rollers disposed in said recess between said pin and a wall of said recess effective to limit the angular rotation of said piston with respect to said cylinder.

7. In a transmission of the type having an engageable and releasable brake, a cylinder, a fluid pressure responsive piston axially movable with respect to said cylinder and rotatable with respect to said cylinder, said piston being effective to initiate engagement of said brake in response to fluid pressure supplied to said cylinder, a recess in said piston, a pin fixed to said cylinder and extending into said recess, said piston being rotated with respect to said cylinder upon initial engagement of said brake, and means effective upon initial rotation of said piston for limiting the range of rotation of said piston with respect to said cylinder and for applying additional thrust to said piston comprising rollers disposed in said piston recess and contacting a wall of said recess and said pin.

8. In a transmission of the type having friction gripping members adapted to be engaged and released, a cylinder, a piston rotatable in said cylinder and axially movable with respect to said cylinder, said piston being axially movable to engage said friction gripping surfaces in response to fluid pressure supplied to said cylinder, said piston being rotatable in said cylinder upon initial contact of said friction gripping surfaces, a recess in said piston, a pin fixed to said cylinder and extending into said recess at an angle to the path of travel of said piston, said recess having a wall disposed at an angle to the path of travel of said piston, and rollers disposed in said recess between said pin and wall for limiting the angular rotation of said piston with respect to said cylinder.

9. In a transmission of the type having a planetary gearing unit and an engageable and releasable brake effective when engaged to permit rotation of one element of said gearing unit, a cylinder, a piston in said cylinder movable in response to fluid pressure for engaging said brake, said piston being capable of both axial motion and rotation with respect to said cylinder, a recess in said piston, a pin fixed to said cylinder and extending into said piston recess at an angle to the path of travel of said piston, a wall on said recess disposed at an angle to the path of travel of said piston and means for limiting the range of angular rotation of said piston and for applying force to said piston acting in assistance to fluid pressure in said cylinder comprising rollers disposed in said recess and contacting said wall and said pin upon rotation of said piston with respect to said cylinder, said piston being rotated with respect to said cylinder upon initial engagement of said brake.

References Cited by the Examiner

UNITED STATES PATENTS

| | | | |
|---|---|---|---|
| 2,245,987 | 6/1941 | Lambert | 188—72 |
| 2,650,796 | 9/1953 | Abraham | 188—72 |
| 3,141,354 | 7/1964 | Herdon et al. | 74—677 |

DAVID J. WILLIAMOWSKY, *Primary Examiner.*

L. H. GERIN, *Assistant Examiner.*

UNITED STATES PATENT OFFICE
CERTIFICATE OF CORRECTION

Patent No. 3,273,674                      September 20, 1966

Kenneth E. Snyder

It is hereby certified that error appears in the above numbered patent requiring correction and that the said Letters Patent should read as corrected below.

Column 4, line 19, after "second" insert -- turbine --; line 23, for "or" read -- of --; line 74, for "coating" read -- coacting --.

Signed and sealed this 1st day of August 1967.

(SEAL)
Attest:

EDWARD M. FLETCHER, JR.                 EDWARD J. BRENNER
Attesting Officer                              Commissioner of Patents